3,326,814
POLISHING COMPOSITIONS WITH OPTICAL
BRIGHTENERS
Ruth Elizabeth Barry Klaas, Arden Hills, Minn.
(10 Oriole Drive, Wyomissing, Pa. 19610)
No Drawing. Filed May 10, 1965, Ser. No. 454,631
9 Claims. (Cl. 252—301.2)

This is a continuation-in-part of application for United States Letters Patent Ser. No. 280,129, filed on May 13, 1963 and abandoned since that time, which application in turn was a continuation-in-part of application for United States Letters Patent Ser. No. 819,831, filed on June 12, 1959 and issued as United States Letters Patent 3,089,280 on May 14, 1963. Application for United States Letters Patent Ser. No. 454,299, filed on May 10, 1965 and copending with this application for United States Letters Patent Ser. No. 454,631, is also a continuation-in-part of application for United States Letters Patent Ser. No. 280,129.

This invention relates to novel compositions of matter reactive with electromagnetic radiation and methods of using same, and in particular to novel visually brilliant coating compositions and methods and devices for using same.

In one broad aspect, this invention relates to novel compositions comprising two materials—typically, resonating aromatic substance like optical brightening material, and electronically metastable substance like acrylic plastic—which in combination act in synergistic fashion to produce a greater effect, on and/or by activation by, light of appropriate wave length or wave lengths, than the sum of the effects which might reasonably be expected by consideration of the individual components thereof. In more specific aspects, this invention relates to combinations comprising optical brightening material and/or other fluorescent dyestuff and electronically metastable metallic ions, to combinations comprising organic plastic and a plurality of fluorescent materials, to combinations comprising acrylic plastic, rare earth salt, and a plurality of fluorescent materials, in all of which cases the total effect observed is greater than the sum of the individual components thereof. Novel methods of using such combinations are also set forth herein.

It is an object of this invention to provide stable polish formulations which are driable to substantially clear, transparent, and (to the unaided human eye) substantially colorless compositions of matter, comprising acrylic plastic and optical brightening material, and characterized by a very high degree of visual brilliance.

It is a further object of this invention to provide a method of converting light energy by passage through compositions of matter comprising organic plastic and a plurality of fluorescent materials, which under some conditions preferably may contain rare earth salt.

It is a further object of this invention to provide liquid coating material, and means of forming protective coating films therefrom, which are characterized by a very high degree of visual brilliance, durability, gloss, resistance to abrasion, and other properties which combine to make embodiments of this invention useful as furniture polishes, floor polishes, shoe polishes, and such like.

All of these objects, and other objects, may be attained by the proper formulation and use of combinations described herein.

As used in this specification and the appended claims, the term "acrylic plastic" is intended to include the true "acrylic" materials, that is, plastics having as a repeating unit in the polymer chain the acrylyl or

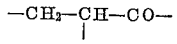

group, methacrylic plastics, polymers formed from a plurality of monomers at least one of which, comprising at least about 25 percent by weight of the total, is acrylic monomer, methacrylic monomer, acrylonitrile, or the like, and like polymers. For the purposes of this invention, it will be obvious to those skilled in the art that the coating materials and films described necessarily are based on acrylic plastics or modifications thereof which inherently have the property of forming films; in other words, the major and surprising aspects of my acrylic plastic/optical brightening material polishes lie in the most unusual and unexpected visual brilliance of the protective films formed therefrom, the effect of such films on incident light rays, and the synergism of the optical brightening material with the acrylic plastic. The synergism of the optical brightening material/acrylic plastic system, for example, is most surprising, since it is observed (through visual observations—that is, to an appreciable, commercially important degree) in the case of formulations comprising acrylic plastic, and has not been observed in chemically similar formulations of optical brightening material and polyvinyl acetate plastic, polymerized butadiene-styrene plastic, or the like. (The fact that a synergistic effect is not observed, for example, in optical brightening material/polyvinyl acetate systems is especially noteworthy and surprising, since in these two cases the plastics involved are practically isomeric.)

Perhaps most surprising of all is the fact that a content of optical brightening material above at least about 1 percent by weight of the solids content of the polish composition comprising optical brightening material and acrylic plastic is required in order to produce a commercially significant degree of visual brilliance, even though the optimum concentration of dye for fluorescence is usually very low (see British Patent 770,889, page 4, lines 98 through 104), and quite frequently in the range of one to only a relatively few parts per million. (See Fry and Kendall, U.S. Patent 2,620,282.) Solid compositions of acrylic plastic containing as much as 1 percent or even larger percentages by weight of optical brightening material have, of course, been disclosed (Horback, U.S. Patent 2,386,855), but no one heretofore has ever formulated a stable polishing composition which takes advantage of the peculiar "glow" and visual brilliance obtainable by adding massive amounts of optical brightening material to aqueous dispersions comprising acrylic plastic, as disclosed herein, even though the trade literature ("New Acrylic Emulsion Brightens Industrial and Household Floor Waxes," Resin Review, IX, No. 2, 7-13, Rohm & Haas Co., Philadelphia, Pa.; ibid., IX, No. 1, 19–26; ibid., IX, No. 1, 27–32; ibid., XIII, No. 1, 18–40; "New Polymer for Floor Polishes Combines Gloss, Clarity, Wear, and Cost Advantages," ibid., XI, No. 2, 3–12; Chemical Week, McGraw-Hill Publishing Co., New York, Mar. 3, 1962, 45–47; ibid., Jan. 20, 1962, 103–106; ibid., June 13, 1959, 117–119) and the patent literature (U.S. Patents 2,909,437; 2,908,578; 2,856,298; 2,874,137; 2,733,224; 2,606,165) clearly indicate that formulation of a polish—especially of a polish based largely on synthetic polymers—for floors, furniture, shoes, or the like having both really satisfactory gloss and really satisfactory hardness (i.e., scuff resistance, wear qualities, and so forth) up to the present time has remained a most urgent and yet unsolved problem of the polish industry. Polishes comprising fluorescent brightener have indeed been formulated (see Matsushita Electric Industrial Company, Ltd., by Hiaso Shimizu and Sadao Kimura, Japan Patent 7630 ('63), May 31, 1963—C.A., 60, 10925² (1964) but have not taken advantage of the peculiarly brilliant visual "brightness" made possible by including sufficient acrylic plastic in the polish composition comprising optical brightener. Polishes commercially available today and based on synthetic polymers in large part almost without exception either have good wear qualities (i.e., hardness and toughness) and poor gloss, or they have poor wear qualities (i.e., softness) and good gloss. (See especially "Polymers Shine in Floor Picture," Chemical Week, McGraw-Hill Publishing Co., New York, June 13, 1959, page 118.)

Polishes made in accordance with my invention may be formulated with hard resins (which contribute hardness and wear resistance), buffed, if necessary, optionally by a novel floor polishing machine which passes a hot stream of gas against the polished surface during the buffing operation and/or otherwise heats the applied wax during the buffing operation, and the apparent gloss or visual brilliance of the polished surface built up to almost any desired degree by use of massive amounts of optical brightening material in the polish formulation, the preferred range of concentration of optical brightening material being in the range of 1 to 4 percent by weight of the polish formulation.

It is generally advantageous to add to my preferred polish formulations especially, but in general to all of the polish formulations described herein, at least one dispersing agent (surface-active agent) of the types disclosed in "New Polymers for Floor Polishes Combine Gloss, Clarity, Wear, and Cost Advantages," Resin Review, XI, No. 2 (Rohm & Haas Co., Philadelphia, Pa.) and/or U.S. Patent 2,937,098. Water-spotting may be minimized in the finished wax coat merely by adding to the coating dispersion polymer material (e.g., acrylic plastic to which has been grafted molecules containing hydroxyl groups) and a metal chelate salt (e.g., octylene glycol titanate) or metal salt (e.g., rare earth salt) having the property of chelating through hydroxyl groups. Use of octylene glycol titanate in polishes, of course, is old in the art (see U.S. Patent Nos. 2,628,170; 2,628,171; and 3,083,114). French Patent 1,327,891 also may be of some interest. Use of grafted hydroxyl-containing acrylic polymers with titanate materials, however, is believed to be novel.

Beyond the above general definition and explanation of the term "acrylic plastic," no attempt is made herein to define the types of acrylic plastics which must be employed in film-forming coating materials, since the type of acrylic plastic needed will be obvious—at least as to general type and physical properties—to those versed in the art and provided with the benefit of this disclosure: see Billmeyer, "Textbook of Polymer Chemistry," Interscience Publishers, Inc., New York, 1957; Schildknecht, "Vinyl and Related Polymers," John Wiley & Sons, Inc., New York, 1952; Riddle, "Monomeric Acrylic Esters," Reinhold Publishing Corp., New York, 1954; and bibliographical references in these books. For example, it will be evident to those skilled in the art that the average molecular weights of the plastics of my coating compositions should fall in the range above about 10,000, and preferably in the range of about 150,000 or even higher. Again, polymethacrylate/polyacrylate films of the types described herein tend to have relatively greater visual brilliance if the latices from which such films are deposited contain polymethacrylate and polyacrylate particles of low average particle size (about 0.2 micron or less) and/or relatively low molecular weight (above 10,000 on the average, but averaging below 30,000). I have found that optical brightening material enhances the visual brilliance of polymethacrylate/polyacrylate films of the types described herein to a most marked degree when the latices from which such films are deposited are comprised of polymethacrylate and polyacrylate particles of relatively large average particle size (in the range of 1 micron or more) and relatively high molecular weight (in the range of 100,000 to 1,000,000 or more).

As used in this specification and the appended claims, by terms follow generally the nomenclature and usage employed in the article, "Fluorescence and Phosphorescence," in Encyclopaedia Brittanica, Encyclopaedia Brittanica, Inc., Chicago, 1958, volume 9, pages 422 to 427. My term "optical brightening material" refers to dyestuff which has the property of absorbing ultraviolet radiant energy and re-emitting (fluorescing) light energy in the visible—generally in the blue, but in some instances farther toward the red region of the spectrum, in such a fashion so that the dyestuff contributes (to the unaided human eye) essentially no color at all, or at most no more than a faint suggestion of color, to an object treated with relatively small amounts of said dyestuff. Most of the commercially available dyestuffs of this type are derivatives of diaminostilbene (see U.S. Patent 2,703,801), dibenzothiophene (see U.S. Patents 2,563,493 and 2,702,759) and like materials of complicated molecular structure. (See U.S. Patents 2,606,809; 2,702,296; 2,759,786; Australian Patent 214,444; Belgian Patent 571,771; U.S. Patent 2,434,496; 2,568,864; 2,693,492; 2,732,386; 2,777,828; 2,823,196; 2,824,080; 2,839,418; 2,853,466; 2,374,146; 2,876,210; 2,883,361; British Patent 748,190.) For the purposes of this invention, any of the commonly used optical brightening materials is useful, as long as it is physically compatible with the acrylic system and does ont bring about long-term instability thereof. To those versed in the art and provided with the benefit of this disclosure, it will also be evident that some optical brightening material can be expected to be more effective than others. Thus, I have found that 1 percent, plus or minus about 0.3 percent, is normally about the lower limit of optical brightening material content in my polish compositions, if said compositions are to have a commercially significant amount of visual brilliance over and above that which could be expected to be produced by the addition of organic brightening material to plastic. In theory, of course, it should be possible to detect this effect at lower concentrations; in practice, however, no one heretofore has observed this effect, or developed a formulation of a stable polish exploiting this effect, despite the crying need for such a formulation, particularly in the floor polish field.

"Electronically metastable" substance, as that term is used herein, refers to material which, under the conditions set forth, is relatively "electron-rich" or "electron-poor" (e.g., acrylic plastic containing nitrile or carbonyl groups) in such a fashion, and to such a degree, that substantial synergistic interaction with appropriate types of resonating aromatic dyestuff (as described herein) occurs on irradiation of the system with light of the appropriate wave length or wave lengths. It will be readily appreciated, of course, that the condition of "electronic metastability" of any one component of a given system will depend on the conditions of use and character of the other components of the system.

It seems worth while to emphasize again that the effects I obtain with my acrylic plastic/optical brightening material formulations are not obtained, at least at any partical degree of loading with optical brightening material, with any latices other than latices of acrylic plastic. Thus, polymerized styrenebutadiene latices, polyvinyl acetate latices, polyvinyl chloride latices, and such like perform very poorly in comparison, even in combination with large amounts of optical brightening material, whereas inclusion of even relatively small amounts of acrylic substance—at least about 25 percent by weight— along with optical brightening material in the polymer immediately produces the synergistic effect of my invention. This effect is most evident in comparison of compositions comprising optical brightening material and high-acrylic plastic (as polyethyl acrylate), medium-acrylic plastic (as in certain polymerized butadiene-acrylonitrile latices), and/or low-acrylic plastic (as blends of polyalkyl acrylate latices with polyvinyl acetate latices, or terpolymer dispersions containing substantially less than 30 mole percent of acrylic moieties in the polymer), with compositions comprising optical brightening material and such standard polymer dispersions as latices of polyvinyl acetate, polyvinyl chloride, or such like.

In the example that follow, it should be noted that optimum results are obtained when surface-active agents are added to the acrylic plastic/optical brightening material formulations. Also, it should be noted that equivalents of my aqueous acrylic plastic/optical brightening material may be produced in which there is practically zero content of water, by drying the aqeuous acrylic dispersion produced as an intermediate, re-dissolving in non-aqueous solvent (such as an appropriate solvent or blend of solvents selected from the class including benzene, xylenes, ketones, alcohols, and various hydrocarbon and non-hydrocarbon solvents), and then adding the optical brightening material and surface-active agent of the proper type, or non-aqueous equivalents of my dispersions may be produced from acrylic substance polymerized in bulk, or non-acqueous equivalents may be produced in various other ways, as will be obvious to those versed in the art. Such non-aqueous equivalents are intended to be included in the scope of my invention; I have found solvent dispersions of acrylic plastic/optical brightening material/surface-active agent particularly useful when packed in aerosol containers equipped with push-button dispenser tips.

FIRST SERIES OF EXAMPLES

Five hundred and forty grams distilled water was charged into a 1-liter reaction flask fitted with gas inlet tube, mechanical stirrer, and reflux condenser. Three grams lauryl sulfate was dispersed in the water, and 86 grams methyl methacrylate monomer was then added. Stirring was commenced at a rate of 300 revolutions per minute, the system flushed with nitrogen gas, and heated to 50° C. One gram potassium persulfate and 0.3 gram sodium bisulfite were added, and the temperature raised to 60° C. over a period of 10 minutes with continued mechanical agitation and flushing with nitrogen. Over the next 40 minutes, the temperature was gradually raised to 75° C., and an additional 0.3 gram potassium persulfate and 0.1 gram sodium bisulfite were then added. Finally, the temperature was raised to 90° C. over a period of about 10 minutes, and the reaction mass then cooled to room temperature. The product of this reaction was a finely dispersed emulsion of polymethyl methacrylate (more accurately, methyl polymethacrylate) having about 10.7 percent of polymer solids by weight. This emulsion was assigned the designation "Latex A."

The polymer of "Latex A" was characterized by air-drying a sample on a polyperfluoroethylene release film over anhydrous calcium chloride, and then noting its brittle point (in degrees centigrade), its swelling-solubility characteristics in o-xylene and o-xylene/benzene, and the viscosity of an o-xylene solution containing 2.5 percent by weight of the polymer, in comparison with a commercial standard. On the basis of these measurements, the average molecular weight of the polymer of "Latex A" was estimately 12,000.

Seventy grams of "Latex A" were heated to 95° C. on a small water bath, 2 grams of oleic acid dispersed therein, and next 1.25 grams morpholine added. The dispersion was shaken vigorously, and cooled to room temperature with shaking. This dispersion was assigned the designation "Latex B."

To 73.5 grams of "Latex B," prepared as described above, there were added 3 grams of a dyestuff prepared as described in Example 3 of U.S. Patent 2,703,801, and assigned the designation—for the purposes of this disclosure—"Optical Brightening Material I," which material, perhaps less conveniently, could be known as the sodium salt of 2,4-di-O-phenoxy-1,3,5 triazyl (6) diaminostilbenedisulfonic acid—i.e., a derivative of the sodium salt of 2,4-dichloro-1,3,5 triazyl (6) diaminostilbenedisulfonic acid in which the chlorine atoms have been replaced by phenoxy groups bound to the triazyl rings through the oxygen atoms of the phenoxy groups. The resultant formulation was assigned the designation "Latex C."

All three of these latices were then tested as polishes, by noting apparent gloss and visual brilliance of the films (if any) obtained on drying for 1 hour, and then buffing with a smooth soft cloth sufficiently vigorously to develop surface temperatures in the range of 190° F., on smooth varnished pine wood, on asphalt floor tile, and on shoe leather finished in the usual manner and ready for polishing. It should be noted that in all cases of Example 3 below, the finish obtained had visual brilliance and gloss superior or at least equal to standard—i.e., equal to that obtained by use of a standard commercial polish sold for the specific end-use under test. (Thus, the "standard" to which there is reference in the fifth vertical column of Table I was a popular brand of liquid shoe polish found to be about average in respect to gloss and visual brillance among all shoe polishes tested.)

TABLE I

| Ex. No. | Polish Employed | Overall Quality of Polish Finish on— | | |
|---|---|---|---|---|
| | | Varnished Wood | Asphalt Tile | Shoe Leather |
| 1 | Latex A | Chalky | Chalky | Fair. |
| 2 | Latex B | Good | Fair to good | Equals standard. |
| 3 | Latex C | Very good | Good | Do. |

SECOND SERIES OF EXAMPLES

"Latex D" was made by exactly the same procedure as that used in the preparation of "Latex A," except that ethyl acrylate monomer, rather than methyl methacrylate monomer, was polymerized. The polyethyl acrylate (more accurately, ethyl polyacrylate) obtained was characterized by methods analogous to those employed in characterizing the polymer of "Latex A" above. The average molecular weight of the polymer of "Latex D" was estimated to be about 11,000. (See Riddl, "Monomeric Acrylic Esters," Reinhold Publishing Corp., New York, 1954, page 63; Billmeyer, "Textbook of Polymer Chemistry," Interscience Publishers, Inc., New York, 1957, pages 128 to 139.)

"Latex E" was made by mixing equal volumes of "Latex A" and "Latex D."

"Latex F" was prepared by adding to 100 grams of "Latex A" 4 grams of a dyestuff prepared as described in Example 1 of U.S. Patent 2,703,801, and assigned the designation—for the purposes of this specification—"Optical Brightening Material II," which material, perhaps less conveniently, could be known as the sodium salt of 2-O-phenoxy-4-N-morpholinyl 1,3,5 triazyl (6) diaminostilbenedisulfonic acid—i.e., a derivative of the sodium salt of 2,4-dichloro 1,3,5 triazyl (6) diaminostilbenedisulfonic acid in which one of the two chlorine atoms attached to each triazyl ring has been replaced by a phenoxy group bound to the triazyl ring through oxygen of the phenoxy group, while the other chlorine atom attached to each triazyl ring has been replaced by a morpholinyl group bound to the triazyl ring through the nitrogen of the morpholinyl group.

"Latex G" was prepared by adding to 100 grams of "Latex D" 4 grams of "Optical Brightening Material II."

"Latex H" was prepared by adding to 100 grams of "Latex E" 4 grams of "Optical Brightening Material II."

TABLE II

| Example No. | Polish Employed | Characteristics of Film | Overall Rating as Polish |
|---|---|---|---|
| 4 | Latex A | Milky; chalks | Very poor. |
| 5 | Latex D | Soft; some tack | Poor. |
| 6 | Latex E | Good smooth film | Fair. |
| 7 | Latex F | Milky; chalks | Poor. |
| 8 | Latex G | Soft; some tack | Do. |
| 9 | Latex H | Good smooth film | Good. |

"Overall Rating as Polish," in Table II above, was obtained by visual observation of the performance of the listed latices as polishes on varnished wood, on asphalt tile, and on shoe leather. In each case, the polish was applied, allowed to dry for 1 hour, and then buffed lightly with a soft cloth.

THIRD SERIES OF EXAMPLES

"Latex I" was a commercial polymethacrylate latex generally equivalent to "Latex A," but supplied at a solids content of 38 percent, and an average particle size of about 0.1 micron. The average molecular weight of the polymer of "Latex I," as estimated by the same methods used for estimation of the molecular weight of the polymer in "Latex A," was in the range somewhat above 100,000.

"Ltaex J" was a commercial polymethacrylate latex generally equivalent to "Latex D," but supplied at a solids content of 46 percent, and an average particle size of about 0.1 micron. The average molecular weight of the polymer of "Latex J," as estimated by the same methods described above for the estimation of the average molecular weight of the polymer of "Latex A," was in the range somewhat above 100,000.

"Optical Brightening Material III" was a commercial optical brightening material equivalent for the purposes of this invention to the above-described "Optical Brightening Material I."

*Example 10*

The following ingredients were combined in the order as given:

| | Grams |
|---|---|
| Water | 50 |
| Non-ionic surfactant of polyethoxylated octylphenol prepared by reacting about 25 moles ethylene oxide with octylphenol under conditions well known to those versed in the art | 0.5 |
| "Optical Brightening Material III" | 4 |
| Defoaming agent of polymerized dimethylsilane diol defoamer, prepared by methods set forth in standard references on silicones: see McGregor, "Silicones and Their Uses," McGraw-Hill Book Co., Inc., New York, 1954, especially pages 272–276 | 0.05 |
| Perfume (optional) | 0.15 |
| "Latex I" | 13 |
| "Latex J" | 13 |

A funiture polish with excellent leveling properties and excellent gloss, as compared to the best commercial household polishes in tests on finished (varnished) dark mahogany furniture, was obtained by combining the latex mixture, as set forth above, with a shellac ammonia dispersion (14 parts shellac, 2 parts 28 percent aqueous ammonia, and 84 parts water) in the ratio of 0.5 part shellac-ammonia dispersion per part of latex mixture. Better gloss was obtained by increasing the proportion of latex mixture in the fomulation, and better leveling was obtained by increasing the proportion of shellac-ammonia dispersion. Relatively poor gloss, however, was observed in the polish film when the proportion of acrylic plastic was reduced below about 50 percent (solids basis), and the optical brightening material appeared to have little effect on the properties of the polish at acrylate content (i. e., acrylic content) less than about 25 percent by weight (solids basis).

*Example 11*

A polish, which on vigorous buffing gave an excellent and remarkably abrasion-resistant finish on a varnished pine floor-board, was made by combining the following ingredients at 90° C. in the order as given, and then cooling the mixture gradually to room temperature with vigorous agitation:

| | Grams |
|---|---|
| "Latex I" | 25 |
| Oleic acid | 2 |
| Morpholine | 1.25 |
| "Optical Brightening Material III" | 3 |

This polish also showed promise in the finishing of floor tile.

FOURTH SERIES OF EXAMPLES

In this series of examples, various polishes were made up by simple mixing of the ingredients in the order from left to right as set forth in Table III below, and the resulting polishes then rated by visual inspection on varnished wood and on asphalt tile. It was noted that amounts of optical brightening material in the polishes above about 2 percent by weight of the composition had a marked tendency to produce instability of the polish on storage, although this instability could be overcome in most cases by adding additional amounts of surface-active agent. In addition, it was noted that amounts of optical brightening material above about 2 percent by weight of the composition had relatively little additional brightening effect, and that an amount of optical brightening material below about 1 percent of the solids content of the polish had no noticeable brightening effect. The optimum content of brightening agent appears to be in the range from 1 to 2 percent by weight of the composition, at the solids content range of 12 to 20 percent commonly used in commercial polish formulations.

"Mixed Brighteners V" was a dry mixture of "Optical Brightener II" (25 parts by weight), "Optical Brightener III" (25 parts by weight), and 50 parts by weight of an optical brightener equivalent for the purposes of this specification, to that prepared in Example 5 of U.S. Patent 2,703,801, which dyestuff, perhaps less conveniently than might be desired, could be known as the sodium salt of 2-O-phenoxy-4-N-piperidyl-1,3,5 triazyl (6) diaminostilbenedisulfonic acid—i. e., a derivative of the sodium salt of 2,4 - dichloro - 1,3,5 triazyl (6) diaminostilbenedisulfonic acid in which one of the two chlorine atoms attached to each triazyl ring has been replaced by a phenoxy group, while the other chlorine atom attached to each triazyl ring has been replaced by a piperidyl group attached to the triazyl ring through the nitrogen of the piperidyl group.

"Rare Earth Salt VI" was a commercial mixture of rare earth sulfate, having approximately the following content of the various rare earths, calculated as oxides:

| | Percent |
|---|---|
| $CeO_2$ | 20.6 |
| $La_2O_3$ | 10.3 |
| $Nd_2O_3$ | 7.3 |
| $Pr_6O_{11}$ | 2.2 |
| $Sm_2O_3$ | 1.3 |
| $Gd_2O_3$ | 0.9 |
| $Y_2O_3$ | 0.1 |
| Other rare earth oxides | 0.3 |

Surfactant VII was a common commercial surfactant of the type defined in claim 1 of U.S. Patent 2,937,098; any surfactant so defined was found to be satisfactory.

TABLE III

| Example No. | Water (g.) | Optical Brightener III (g.) | Mixed Brighteners V (g.) | Rare Earth Salt VI (g.) | Surfactant VII (g.) | Latex I (g.) | Latex J (g.) | Overall Rating as Polish on Wood | Overall Rating as Polish on Asphalt Tile |
|---|---|---|---|---|---|---|---|---|---|
| 12 | 99 | — | — | — | — | 50 | 50 | Fair | Fair. |
| 13 | 99 | 1 | — | — | — | 50 | 50 | Very bright | Very bright. |
| 14 | 99 | — | 1 | — | — | 50 | 50 | Bright | Bright. |
| 15 | 99 | — | — | 1 | — | 50 | 50 | Very bright | Very bright. |
| 16 | 99 | — | — | — | 1 | 50 | 50 | Fair | Fair to good. |
| 17 | 98 | 1 | — | 1 | — | 50 | 50 | Bright; good | Bright; good. |
| 18 | 98 | — | 1 | 1 | — | 50 | 50 | ----do---- | Do. |
| 19 | 97 | 1 | — | 1 | 1 | 50 | 50 | ----do---- | Do. |
| 20 | 97 | — | 1 | 1 | 1 | 50 | 50 | ----do---- | Do. |
| 21 | 99 | — | — | — | — | 50 | 50 | Fair | Fair. |
| 22 | 99 | — | — | 0.1 | — | 50 | 50 | Bright | Bright. |
| 23 | 98 | 2 | — | — | — | 50 | 50 | Very bright | Very bright. |
| 24 | 98 | — | 2 | — | — | 50 | 50 | ----do---- | Do. |
| 25 | 98 | 2 | — | 0.1 | — | 50 | 50 | ----do---- | Do. |
| 26 | 98 | — | 2.0 | 0.1 | — | 50 | 50 | ----do---- | Do. |
| 27 | 96 | 4 | — | — | — | 50 | 50 | ----do---- | Do. |
| 28 | 96 | — | 4 | — | — | 50 | 50 | ----do---- | Do. |
| 29 | 96 | 4 | — | 0.1 | — | 50 | 50 | ----do---- | Do. |
| 30 | 96 | — | 4 | 0.1 | — | 50 | 50 | ----do---- | Do. |
| 31 | 92 | 8 | — | — | — | 50 | 50 | ----do---- | Do. |
| 32 | 92 | — | 8 | — | — | 50 | 50 | ----do---- | Do. |
| 33 | 92 | 8 | — | 0.1 | — | 50 | 50 | ----do---- | Do. |
| 34 | 92 | — | 8 | 0.1 | — | 50 | 50 | ----do---- | Do. |
| 35 | 99 | — | — | — | — | 75 | 25 | Poor, even after hot buff | Poor, even after hot buff. |
| 36 | 99 | — | — | 0.1 | — | 75 | 25 | Fair to poor even after hot buff. Fair, before hot buff. | Fair to poor, even after hot buff. Poor, before hot buff. |
| 37 | 96 | 4 | — | — | — | 75 | 25 | Poor, before hot buff. Excellent brightness and wear resistance after hot buff. | Poor, before hot buff. Excellent brightness and wear resistance after hot buff. |
| 38 | 96 | — | 4 | — | — | 75 | 25 | ----do---- | Do |
| 39 | 96 | 4 | — | 0.1 | — | 75 | 25 | ----do---- | Do. |
| 40 | 96 | — | 4 | 0.1 | — | 75 | 25 | ----do---- | Do. |

In the "hot buff" procedure mentioned in Examples 35 to 40 inclusive, the surface was treated with polish, the polish allowed to dry, and the polished surface then buffed with two discs of ordinary Turkish toweling, each six inches in diameter and mounted on an ordinary quarter-horsepower domestic floor scrubber, with the two brushes rotating about 200 revolutions per minute, and with about 20 cubic feet per minute of hot air (250° F.) being blown down through the Turkish toweling during the buffing operation, the same stream of hot air being obtained from a slightly modified hair drier. The surface obtained from a composition of hard resin (principally, for example, methyl polymethacrylate) and optical brightening material and surfactant according to my invention by a hot buffing procedure of this type is outstanding with respect to both gloss and wear resistance.

It was found possible to make solvent analogues of the various polishes set forth in Examples 12 to 40 inclusive merely by taking polymer in bulk, or as obtained by drying of the polymer latex as received, dissolving the same in appropriate solvent (such as benzene/xylene) with in some cases small amounts of alcohols or ketones to dissolve some of the surfactant and/or optical brightening material. Such solvent analogues are especially useful as vehicles for permanent protective coatings, and for dispensing, as in the case of furniture polish, especially from so-called aerosol containers.

I failed to obtain a commercially significant amount of visual brilliance in my attempts to formulate, with reasonable amounts and proportions of optical brightening material, polishes having a resin phase of less than about 25 percent acrylic substance by weight. Other resins checked for this kind of synergistic activity with optical brightening material included: an aqueous dispersion of polyvinyl alcohol; a commercial latex of polyvinyl acetate; a commercial vinyl acetate-acrylic terpolymer emulsion; a commercial polymerized butadiene-styrene latex; a commercial butadiene-acrylonitrile latex; a commercial polyvinyl chloride latex; a commercial vinyl acetate/vinyl stearate copolymer latex; and others.

FIFTH SERIES OF EXAMPLES

In this series of examples, various combinations of acrylic polymers, commercial waxes, optical brightening materials, plasticizers, surfactants, octylene glycol titanate, zirconium sulfate, rare earth salts, and such like were formulated in coating compositions, and the performance of the coatings evaluated in use.

"Latex K" was a latex of acrylic copolymer having a monomer ratio equivalent to approximately 50 percent by weight of methyl methacrylate and 50 percent by weight of ethyl acrylate, a solids content of approximately 38 percent by weight, and an average molecular weight in the range somewhat above 60,000.

"Latex L" was a latex of graft copolymer formed by adding 2 percent by weight of 2 - hydroxyethyl methacrylate to "Latex K," allowing the mixture to stand, after thorough mixing, for 24 hours, adding 0.25 percent by weight of ammonium persulfate, adjusting the iron content of the water phase to approximately 6 parts per million, of ferrous ion content, excluding air rigorously, mixing thoroughly, and then heating to a temperature of approximately 60° C. over a period of 2 hours, followed by gradual cooling over a period of approximately 12 hours.

"Latex M" was a latex of graft copolymer formed in exactly the same manner as "Latex L" above, except that 4 percent by weight of 2-hydroxyethyl methacrylate, rather than 2 percent by weight of 2-hydroxyethyl methacrylate, was added to the "Latex K."

"Latex N" was a latex of graft copolymer formed in exactly the same manner as "Latex M" above, except that hydroxypropyl methacrylate monomer, rather than 2-hydroxyethyl methacrylate, was added to "Latex K."

"Latex O" was a latex of polymer having a chemical composition equivalent to a methyl methacrylate/ethyl acrylate/acrylic acid ratio of 58/40/2, a solids content of approximately 35 percent, and an average molecular weight in the range somewhat above 70,000.

"Latex P" was a latex of graft copolymer formed by adding 4 percent by weight of 2-hydroxyethyl methacrylate to "Latex O," mixing thoroughly, allowing the mixture to stand for 24 hours, adding 0.25 percent by weight of ammonium persulfate, adjusting the ion content of the water phase to approximately 6 parts of ferrous ion per million parts of water, excluding air rigorously, mixing thoroughly, and then heating to a temperature of approximately 60° C. over a period of 2 hours, followed by gradual cooling over a period of approximately 12 hours.

"Latex Q" was a latex of graft copolymer formed in exactly the same manner as "Latex P," except that hydroxypropyl methacrylate, rather than 2-hydroxyethyl methacrylate, was added to the "Latex O."

"Plasticizer II" was acetyltributyl citrate.
"Plahticizer II" was acetyltributyl citrate.

"Surfactant VII" was used in many of the formulations of this series; however, reasonably good dispering properties, although somewhat less excellent leveling and gloss properties were achieved by using, instead of the commercial grade of fluorochemical surfactant commonly used in polishes (see, for example, formulations in Resin Review, Rohm & Haas Company, Philadelphia, Pa., IX, No. 2, page 13, and specific example of perfluorinated potassium salt of 2,4-diethylcyclohexane sulfonic acid mentioned in U.S. Patent 3,163,547, issued on Dec. 29, 1964) a polyethoxy compound of the type formed by condensing approximately twenty-five moles of ethylene oxide with octylphenol under conditions well known to those versed in the prior art.

"OGT," as that abbreviation is used in the table following, refers to a commercial grade of octylene glycol titanate prepared from 2-ethyl hexanediol-1,3. Analogous titanates may be used in place of octylene glycol titanate with generally satisfactory results, although I prefer to work only with glycols in which octylene glycol titanate would be in the upper part of the range of molecular weights.

"Wax Diluent" in the following table was a commercial grade of wax polish equivalent, for the purposes of this disclosure, to material prepared in the laboratory by the following procedure:

(1) Melt together, with stirring, 8 grams of oleic acid and 40 grams of carnauba wax. Heat to 95° C.
(2) Add 5 grams of morpholine, with vigorous stirring.
(3) Stir into the mixture 20 grams of boiling water, and mix until clear.
(4) Slowly stir into the mixture an additional 220 grams of boiling water.
(5) Cool with stirring.

Better leveling and somewhat better gloss generally were observed, in the formulations in which "Wax Diluent" was used, when the "Wax Diluent" was blended with approximately 15 percent by weight of a shellac dispersion made up from 14 parts shellac, 2 parts ammonia (28 percent), and 84 parts of water.

Other abbreviations in the table will be clear to those used in the art. All additions were made with thorough mixing, generally in the order of ingredients from left to right in the table.

| Example No. | Latex K | Latex L | Latex M | Latex N | Latex O | Latex P | Latex Q | Water of Dilation | Optical Brightener I | Optical Brightener II | Plasticizer I | Plasticizer II | Surfactant | OGT | Rare Earth Salts | Zirconium Sulfate | Diluent Wax | Initial Gloss | Gloss After Buffing |
|---|---|---|---|---|---|---|---|---|---|---|---|---|---|---|---|---|---|---|---|
| 41 | | | | | | | | 15 | | | | | | | | | 15 | Good | |
| 42 | | | | | | | | 15 | | | | | | | | | 15 | do | |
| 43 | 10 | | | | | | | 15 | | .2 | | | | | | | | do | |
| 44 | 10 | | | | | | | 15 | | .2 | | | | | | | | Exc | |
| 45 | 10 | | | | | | | 15 | | | | | | .1 | | | | Good | |
| 46 | 10 | | | | | | | 15 | | .2 | | | | .1 | | | | Exc | |
| 47 | | 10 | | | | | | 15 | | .2 | | | | | | | | Good | |
| 48 | | 10 | | | | | | 15 | | | | | | .1 | | | | do | |
| 49 | | 10 | | | | | | 15 | | .2 | | | | .1 | | | | do | |
| 50 | | 10 | | | | | | 15 | | | | | | | | | | do | |
| 51 | | | 10 | | | | | 15 | | .2 | | | | | | | | | |
| 52 | | | 10 | | | | | 15 | | | | | | .1 | | | | Good | |
| 53 | | | 10 | | | | | 15 | | .2 | | | | .1 | | | | do | |
| 54 | | | 10 | | | | | 15 | | .2 | | | | | .1 | | | | |
| 55 | | | 10 | | | | | 15 | | .2 | | | | | | .1 | | | |
| 56 | | | 10 | | | | | 15 | | | | | | | | | | Fair | |
| 57 | | | 10 | | | | | 15 | | | | | .1 | .1 | | | | | |
| 58 | | | 10 | | | | | 15 | | .2 | | | .1 | .1 | | | 15 | Exc | |
| 59 | | | 10 | | | | | | | .2 | | | .1 | .1 | | | | | |
| 60 | | | | 10 | | | | 15 | | .2 | .1 | | | .1 | | | | Good | Exc. |
| 61 | | | | | 10 | | | 15 | | .2 | .1 | | | .1 | | | | do | Good. |
| 62 | | | | | | 10 | | 15 | | .2 | | .1 | | .1 | | | | | |
| 63 | | | | | | | 10 | 15 | .2 | | | | | .1 | | | | Good | Exc. |
| 64 | | | | | | | 10 | 15 | .2 | | | | | .1 | | | | | |
| 65 | | | 10 | | | | | 15 | .2 | | | | .1 | .1 | | | 15 | | |
| 66 | | | 10 | | | | | 15 | .2 | | | | .1 | .1 | | | | Poor | Exc. |
| 67 | | | | | 10 | | | 15 | | .2 | .1 | | | .1 | .1 | | | do | Exc. |
| 68 | | | | | | 10 | | 15 | | .2 | .1 | | | .1 | .1 | | | do | Good. |
| 69 | | | | | 10 | | | 15 | | .2 | .1 | | | | | .1 | | Exc | Exc. |
| 70 | | | | | | 10 | | 15 | | .2 | .1 | | | | | .1 | | Poor | Exc. |
| 71 | | | | | | | 10 | 15 | | .2 | .1 | | | | | .1 | | do | Exc. |
| 72 | | | 10 | | | | | 15 | | .4 | | | .1 | .05 | | | | | |
| 73 | | | 10 | | | | | 15 | | .1 | | | .1 | .4 | | | | | |
| 74 | | | 10 | | | | | 15 | | .2 | | | .1 | .05 | | | | | |
| 75 | | | 10 | | | | | 15 | | | | | | | | | 15 | | |
| 76 | | | 10 | | | | | 15 | | .2 | | | | | | | 15 | Exc | |
| 77 | | | 10 | | | | | 15 | | | | | | .1 | | | 15 | Exc | |
| 78 | | | 10 | | | | | 15 | | .2 | | | | .1 | | | 15 | Exc | |
| 79 | | | 10 | | | | | 15 | | .2 | | | | | | | 15 | Exc | |
| 80 | | | 10 | | | | | 15 | | .2 | | | | | | .1 | 15 | Exc | |
| 81 | | | 10 | | | | | 15 | | | | | | | | .1 | 15 | Exc | |
| 82 | | | 10 | | | | | 15 | | .2 | | | .1 | .1 | | | 15 | Exc | |
| 83 | | | 10 | | | | | 15 | | | | | | | | | | | |

A large number of performance tests were run on polishes made up as disclosed above, and also by modification of commercial polishes with additives used in certain of the formulations given in the table, and the following general trends of results were observed:

(1) Addition of approximately 1 percent by weight of optical brightening material to commercially available acrylic-type polishes noticeably improves the "visual brilliance" of such polishes, including polishes of this type containing polymers having acidic groups linked to metal ions such as zirconium ions, and intended to be easily removable with ammonia. Thus, addition of about 1 percent by weight of "Optical Brightening Material III" to the "Wax Diluent" and water (4:1) had no significant effect on its visual brilliance (Examples 41 and 42), but addition of a similar amount of "Optical Brightening Material III" to "Latex K," "Latex L," "Latex M," "Latex O," "Latex P," or "Latex Q" in each case significantly improved the visual brilliance of the latex involved. For example, the product of Example 44 was significantly brighter than the product of Example 43.

(2) Addition of optical brightening material to acrylic-containing dispersions cut back with "Wax Diluent" increases the visual brilliance significantly, provided that the acrylic resin proportion of total solids is at least 25 percent by weight, and the content of optical brightening material in the dispersion is at least about 1 percent—i.e., above the minimum of approximately 0.7 percent by weight specified above. For example, the product of Example 77 was "brighter," on visual inspection, than Example 76, and the ultraviolet absorption characteristics of the optical brightening materials are such as to minimize any yellowing of the film laid down from acrylic resin-zirconium salt formulations.

(3) Heavy metals (i.e., metals of high atomic number), as exemplified by rare earth mixtures, zirconium, and titanium, under properly selected conditions, enhance substantially the performance characteristics of my compositions, particularly their visual brilliance, spotting, and removability characteristics. (Removability characteristics may be determined by wiping on a 1 percent solution of household ammonia, allowing for a delay of 1 to 2 minutes, and then wiping off.) The amount of heavy metal compound required to produce significant effects in formulations in which the film-former contains chemically active groups such as carboxylic, alcoholic hydroxyl, and/or such like, is very small—generally, in the range of 0.1 to 0.01 percent—when properties presumably dependent on cross-linking of polymer chains, such as toughness, resistance to water-spotting, and removability with ammonia are desired. (Maximum removability arises with increasing amounts of active groups, such as carboxylate, and metal content; but such removability usually involves reduction of spotting resistance, gloss, and/or other properties.) It is generally difficult, and seldom necessary, to incorporate more than about 2 percent by weight of heavy metal, in combined form, without encountering compatibility problems of the type that must be kept in mind in formulating all of the types of compositions disclosed herein, which, however, will be evident to those versed in the art and provided with the benefit of this disclosure; at any rate, at high contents of heavy metals, special provisions must be made for solubilizing such heavy metal content by use of combining groups on the film-forming material used; i.e., the content of alcohol hydroxyl groups and/or carboxylic groups and/or such like in the film-forming polymer, if necessary at all to obtain the properties desired, should be adjusted in the light of the heavy metal content of the formulation and vice versa, in a manner that will be evident to those familiar with the art and provided with the benefit of this disclosure. Normally, however, the content of active groups such as carboxylic or hydroxyl in the film-forming component of my compositions should be above about 0.1 percent by weight and less than about 5 percent by weight, although noticeable effects will be obtained at ranges somewhat wider than 0.1 percent to 5 percent, just as noticeable effects can be obtained, by proper adjustment of formulation, at concentrations of optical brightening material somewhat outside of the range preferred in the embodiments set forth herein. All such formulations are intended to be encompassed within the scope of my claims, since the essence of the invention lies in the character of the materials used, and approximate proportions thereof set forth; thus, under favorable conditions it is possible to produce a detectable "visual brilliance" effect with optical btrightening material concentrations approaching 0.2 percent, even though I normally would not prefer an embodiment of my invention incorporating optical brightener at concentrations much below about 0.7 percent. For example, heavy metal content, in all of the examples set forth above, produced films generally tougher than control films, and in many cases also enhanced the "visual brilliance" due principally to optical brightener; however, at high content of carboxylic groups and heavy metal ion, addition of the heavy metal compound in some cases produced precipitation, as in Examples 67, 68, 69, and to some extent 70, unless the heavy metal salt was added in the form of a slowly hydrolyzable compound such as an alkylene glycol titanate (e.g., octylene glycol titanate). Heavy metals in combined form, other than zirconium, rare earth, and titanium, may be used in the formulation of compositions along the lines set forth herein, but the selection and concentrations of such metal materials will generally be limited by consideration of inherent properties—e.g., the tendency of silver to darken under the influence of light, the toxicity of lead, and so forth—that will be evident to those versed in the art and provided with the benefit of this disclosure. My preferred embodiments involve formulations of acrylic resin containing hydroxyl groups of alcoholic character, octylene glycol titanate, optical brightening material, and fluorochemical surfactant, all as set forth herein.

(4) The surfactant employed in aqueous-dispersion embodiments of my compositions generally should constitute less than 1 percent by weight of the solids content of the dispersion, and amounts as low as 0.005 percent have been shown to be effective—for example, in the formulation of Example 75, reduction of the surfactant content to 0.005 percent by weight did not drastically deteriorate the performance characteristics of the composition. Unless the leveling properties uniquely available by use of fluorochemical surfactants are being sought, fluorochemical surfactants and polyethoxy surfactants of the kind commonly used in the art may be used more or less interchangeably; as a matter of fact, addition of a few parts to a few thousand parts of such surfactant (e.g., the reaction product of approximately twenty-five moles of ethylene oxide and octylphenol, forming a polyethoxy ether of said phenol) per million parts of dispersion was used routinely to overcome any incompatibility or precipitation problems encountered in the formulation of any of the examples disclosed herein, and judicious use of such material is assumed in the disclosure and specifically in the above table. (Slight precipitates and/or short shelf life problems were encountered in Examples 55, 56, 54, 67, 68 and 69; compositions containing such precipitates of course do not form relatively smooth protective films on evaporation of the aqueous constituent of the composition.) If the leveling properties of the fluorochemical surfactant are desired, these properties generally may be obtained at surfactant concentrations in the range of 0.1 to 0.01 percent.

In this specification, I have sometimes shortened my terms, for convenience of expression and/or tabulation, after defining them; thus, "Optical Brightening Material III" may be referred to as "Optical Brightener III." In such shortened notation, the Roman numeral controls. I have also used other terms and expressions in a manner that, while not literally and strictly accurate, will be clear enough to those versed in the art: thus, when I refer to an "absorption band" of a material in a composition, I mean a group of wave lengths in the spectrum at which the material absorbs electromagnetic radiation, between two regions of the spectrum at which that material is substantially transparent or at least much more transparent than in the absorption band—i.e., I do not mean by "band" that region of the spectrum in the ultraviolet at which substantially all organic materials become opaque. Again, when I discuss a film-former being deposited from a dispersion in a relatively smooth film, I mean, of course, that the film formed will contain also such other constituents as heavy metal salts, optical brightening material, and the like, as well as the film-forming constituent itself. Finally, although my invention in its preferred embodiment is a coating composition, I mean it to include films and other bulk material that falls within the limits of composition set forth herein.

It should be emphasized that the effects I have observed in the practice of my invention are entirely unexpected, and in some embodiments are actually quite the reverse of what those versed in the pertinent art might expect. None of the prior art of which I am aware offers any anticipation of these synergistic effects, or any explanation thereof. Finally, it should be understood that modifications and variations of my invention, as herein described, may be effected without departing from the scope of the novel concepts and such like of this invention, and that I do not intend that the breadth of my invention be limited in any way by the speculations, implicit or otherwise, herein contained concerning possible mechanisms which might usefully be considered in attempting to explain the remarkable synergistic effects actually observed.

I claim:

1. A polishing composition driable to a relatively smooth surface, consisting essentially of: a continuous aqueous phase; a dispersed, non-volatile, water-insoluble solid film-former consisting of at least about 25 percent by weight of acrylic plastic and capable of being deposited in a relatively smooth protective film upon evaporation of the aqueous constituent of said aqueous phase; a small amount of dispersing agent present in the aqueous phase in an amount sufficient to form a stable dispersion of the film former in the aqueous phase with this dispersion breaking down upon evaporation of the aqueous constituent of the phase to form a thin layer of film former in a relatively smooth protective layer on said surface; and as a brilliance-producing agent, at least about 1 percent by weight of the solids content of the composition, and up to about 30 percent by weight of the solids content of the composition, of optical brightening material, said optical brightening material having substantial capacity for absorption of light energy only of the ultraviolet and infrared regions of the spectrum.

2. A polishing composition driable to a relatively smooth surface, consisting essentially of: a continuous aqueous phase; a dispersed, non-volatile, water-insoluble solid film-former consisting of at least about 25 percent by weight of acrylic plastic and capable of being deposited in a relatively smooth protective film upon evaporation of said aqueous phase; a small amount of dispersing agent present in the aqueous phase in an amount sufficient to form a stable dispersion of the film former in the aqueous phase with this dispersion breaking down upon evaporation of the aqueous constituent of the phase to form a thin layer of film-former on a surface thereby depositing the film-former in a relatively smooth protective layer on said surface; dispersed heavy metal compound material, in an amount in the range from about 0.01 percent to about 2 percent; and as a brilliance-producing agent, at least about 1 percent by weight of the solids content of the composition, and up to about 30 percent by weight of the solids content of the composition, of optical brightening material, said optical brightening material having substantial capacity for absorption of light eneragy only of the ultraviolet and infrared regions of the spectrum.

3. A polishing composition according to claim 2, in which the heavy metal is rare earth.

4. A polishing composition according to claim 2, in which the heavy metal is zirconium.

5. A polishing composition according to claim 2, in which the heavy metal is titanium.

6. A polishing composition according to claim 2, in which the acrylic plastic contains carboxylic salt groups.

7. A polishing composition according to claim 2, in which the acrylic plastic contains alcoholic hydroxyl groups.

8. A polishing composition driable to a relatively smooth surface, consisting essentially of: a continuous aqueous phase; a dispersed, non-volatile, water-insoluble solid film-former consisting of at least about 25 percent by weight of acrylic plastic and capable of being deposited in a relatively smooth protective film upon evaporation of the aqueous constituent of said aqueous phase; wax; a small amount of dispersing agent present in the aqueous phase in an amount sufficient to form a stable dispersion of the film former and the wax in the aqueous phase with this dispersion breaking down upon evaporation of the aqueous constituent of the phase to form a thin layer of film former and wax in a relatively smooth protective layer of said surface; and as a brilliance-producing agent, at least about 1 percent by weight of the solids content of the composition, and up to about 30 percent by weight of the solids content of the composition, of optical brightening material, said optical brightening material having substantial capacity for absorption of light energy only of the ultraviolet and infrared regions of the spectrum.

9. A polishing composition driable to a relatively smooth surface, consisting essentially of: a continuous aqueous phase; a dispersed, non-volatile, water-insoluble solid film-former consisting of at least about 25 percent by weight of acrylic plastic and capable of being deposited in a relatively smooth protective film upon evaporation of the aqueous constituent of said aqueous phase; wax; ammonia-shellac; a small amount of dispersing agent present in the aqueous phase in an amount sufficient to form a stable dispersion of the film-former, wax, and ammonia-shellac in the aqueous phase with this dispersion breaking down upon evaporation of the aqueous constituent of the phase to form a thin layer of film-former, wax, and ammonia-shellac in a relatively smooth protective layer on said surface; and as a brilliance-producing agent, at least about 1 percent by weight of the solids content of the composition, and up to about 30 percent by weight of the solids content of the composition, of optical brightening material, said optical brightening material having substantial capacity for absorption of light energy only of the ultraviolet and infrared regions of the spectrum.

References Cited

UNITED STATES PATENTS

| 2,650,309 | 8/1953 | Webb et al. | 252—301.3 |
| 2,985,593 | 5/1961 | Broderick et al. | 252—301.2 |
| 3,041,287 | 6/1962 | Hyman | 252—301.2 |

TOBIAS E. LEVOW, *Primary Examiner.*

R. D. EDMONDS, *Assistant Examiner.*